United States Patent [19]

Molitor

[11] 4,399,992
[45] Aug. 23, 1983

[54] STRUCTURAL MEMBER HAVING A HIGH STRENGTH TO WEIGHT RATIO AND METHOD OF MAKING SAME

[75] Inventor: Robert P. Molitor, South Hadley, Mass.

[73] Assignee: Questor Corporation, Tampa, Fla.

[21] Appl. No.: 128,543

[22] Filed: Mar. 10, 1980

[51] Int. Cl.³ .............................................. A63B 49/10
[52] U.S. Cl. ........................... 273/73 F; 273/DIG. 7; 273/DIG. 8; 273/DIG. 23
[58] Field of Search ................. 273/73 R, 73 C, 73 F, 273/DIG. 1–DIG. 8, DIG. 23, 82 R; 428/313.3, 313.5, 313.9, 71, 76; 521/122, 135, 137

[56] References Cited

U.S. PATENT DOCUMENTS

| | | | |
|---|---|---|---|
| 3,510,392 | 5/1970 | D'Eustachio et al. | 521/122 X |
| 3,585,157 | 6/1971 | Beck | 521/135 X |
| 3,690,658 | 9/1972 | Howe | 273/73 F X |
| 3,707,434 | 12/1972 | Stayner | 273/73 F X |
| 3,755,037 | 8/1973 | Erwin et al. | 273/73 F X |
| 3,849,350 | 11/1974 | Matsko | 521/122 X |
| 4,061,520 | 12/1977 | Cecka et al. | 273/73 F X |
| 4,133,708 | 1/1979 | Tokuno | 273/DIG. 23 |
| 4,135,035 | 1/1979 | Branen et al. | 273/DIG. 23 |
| 4,145,047 | 3/1979 | Nagamoto et al. | 273/73 F |
| 4,173,670 | 11/1979 | Van Auken | 273/DIG. 23 |
| 4,221,382 | 9/1980 | Cooper et al. | 273/73 F |

OTHER PUBLICATIONS

"Modern Plastics"; Syntactic Foam by Davis and Johnson; Sep. 1967; pp. 215, 216, 219, 290.
"Archery"; Jun. 1974; pp. 10-13.

Primary Examiner—Richard C. Pinkham
Assistant Examiner—Matthew Schneider
Attorney, Agent, or Firm—Donald R. Bahr; John E. Benoit

[57] ABSTRACT

A novel structural member, such as a tennis racket, and the method for making same, provides a high strength to weight ratio. The structural member of this invention consists of a fiberglass shell which surrounds a syntactic foam core. The fiberglass shell may be further selectively reinforced with a ribbon which is formed from a high strength fiber such as boron fibers, graphite fibers, aramid fibers, etc. Because the structure of this invention incorporates a high strength to weight ratio it can be utilized in the manufacture of rackets of conventional and radical design.

This invention relates to a structural member consisting of a tennis racket having a high strength to weight ratio.

4 Claims, 8 Drawing Figures

STRUCTURAL MEMBER HAVING A HIGH STRENGTH TO WEIGHT RATIO AND METHOD OF MAKING SAME

BACKGROUND OF THE INVENTION

Structural members are made from many materials and take many forms. Since the present invention is to be illustrated by means of a tennis racket such structural members as described will be related thereto. Tennis rackets have been made from a standard wood structure, various plastics, metals of different types, and composite rackets which are comprised of a combination of any of the above elements.

One of the prime objects in designing and manufacturing a tennis racket is to attempt to provide a good strength to weight ratio which then may be varied in accordance with particular racket requirements. While providing this desirable ratio, the other attributes needed in the racket must also be maintained since, in some structures, the various factors such as stiffness and resiliency, power factor and playability may be damaged if the emphasis is carried too far in the direction of the strength to weight ratio.

Accordingly, it is an object of the present invention to provide a box-type structural member which may be used in tennis rackets and the like which provides a high strength to weight ratio and, at the same time, provides a structure that yields greater latitude in design with the lighter weight providing a range of heretofore unattainable durable, stiff resilient rackets.

Another object of this invention is to provide a structure for use in tennis rackets which is adaptable to selective stiffening during the manufacturing process.

A further object of this invention is to provide a tennis racket having a unique section between the throat and the handle which uses the structure of the present invention.

A still further object of this invention is to provide a racket which has superior dampening properties with a resultant reduction in vibration.

Yet another object of this invention is to provide a structure for a racket wherein a large selective modulus range is available in order to select the particular stress/strain relationship.

Another object of this invention is to provide a racket with a relatively low permanent set which reduces breaks and improves durability.

A further object of this invention is to provide a box-type structural member which allows a great latitude in selection of the stiffness of the bow area.

These and other objects of the invention will become obvious from the following description and the accompanying drawings.

Figure 1:
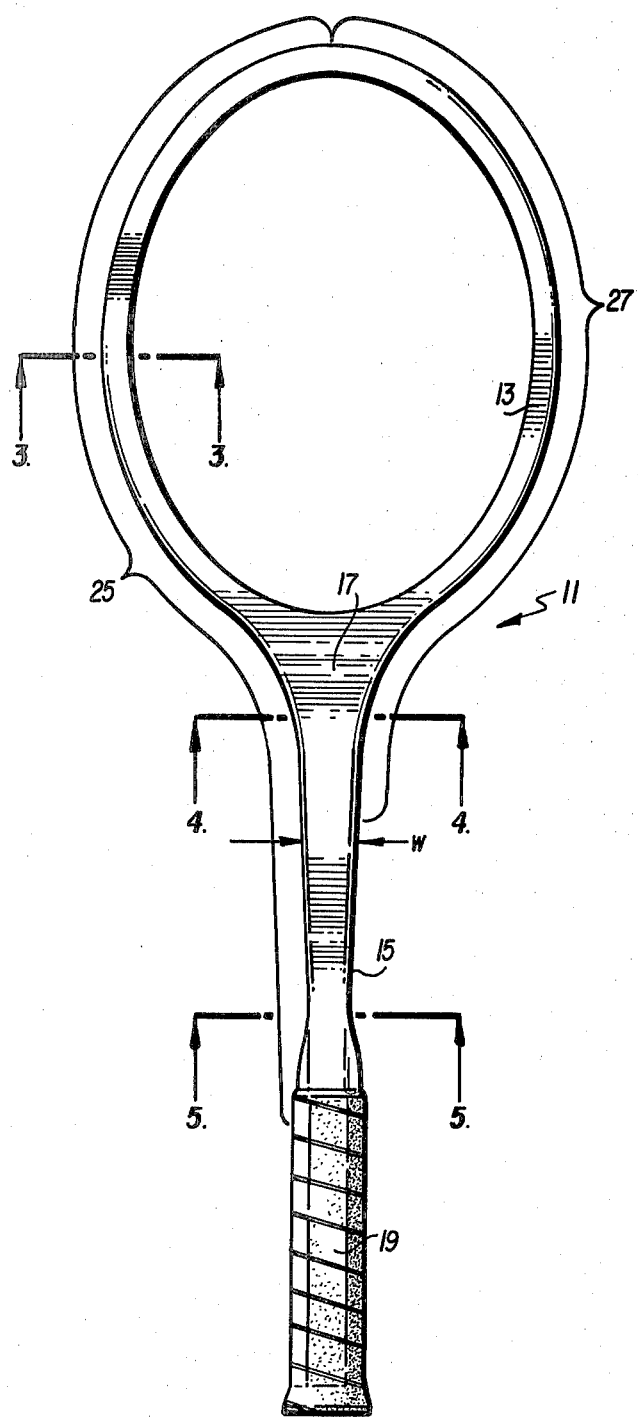
FIG. 1 is a plan view of a preferred tennis racket configuration used in the present invention.
Figure 2:
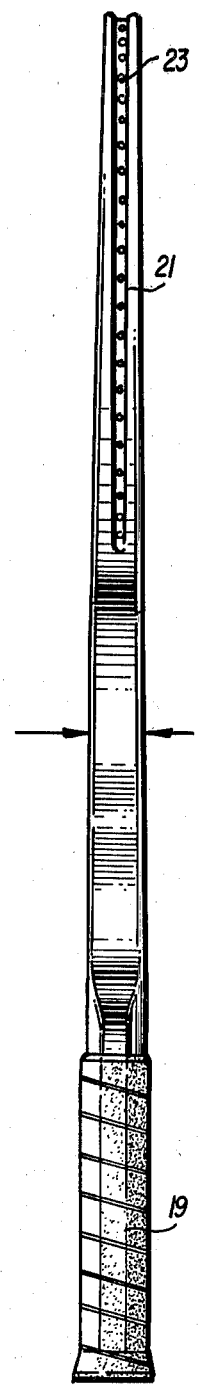
FIG. 2 is a side view of the tennis racket of FIG. 1.

Turning now more specifically to the drawings, there is shown in FIGS. 1 and 2 a tennis racket having one configuration which may be used with the structure of the present invention. The tennis racket 11 has a head 13, a handle 15, an interconnecting throat area 17 and a grip 19. A channel 21 extends substantially about the entire circumference of the head of the racket and contains therein the stringing holes 23.

The indicated sectional areas 25 and 27 illustrate the area of the use of high strength fiber which will be explained in more detail as the description proceeds.

The particular racket shown in FIGS. 1 and 2 is of a unique construction in that the handle area between the throat and the grip assumes a configuration which is rotated substantially 90° about the axis of the handle as compared to the standard handle structure. In this structure, the width of the handle w and the depth of the handle d are substantially equal immediately below the throat area 17. As may be seen, the depth is substantially greater in the handle area than is the depth of the head at the tip thereof. As the handle extends downwardly towards the grip, the width w decreases while the depth d remains substantially constant, thus providing the above described 90° rotation. This particular structure provides a decreased wind resistance while maintaining or increasing the stiffness in the direction of the stroke of the racket.

While the drawings illustrate the above described racket configuration, it is understood by one skilled in the art that the structure of the subject invention can be utilized in the manufacture of any type of racket. In particular, because the structure of the subject invention incorporates a high strength to weight ratio, it is particularly adapted to the manufacture of rackets of what may be construed to be radical design. These radical designs were impossible to manufacture in the past due to strength limitations of existing materials. Because of the advantageous strength properties of the structure of this invention, it is now possible to manufacture these radical designs.

Figure 3:
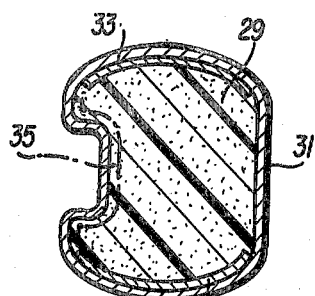
FIG. 3 is a sectional view taken through lines 3—3 of FIG. 1.
Figure 4:
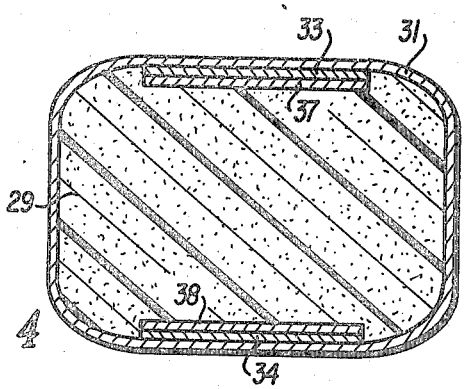
FIG. 4 is a sectional view taken through lines 4—4 of FIG. 1.
Figure 5:
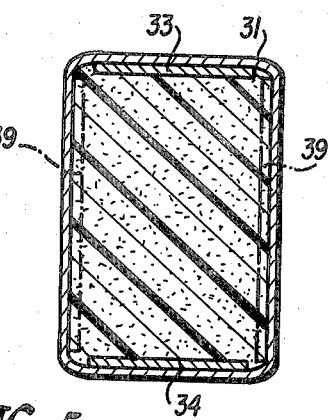
FIG. 5 is a sectional view taken through lines 5—5 of FIG. 1.

FIGS. 3, 4 and 5 illustrate the basic structural member of the present invention. As pointed out above, although this structural member is illustrated as used for tennis racket construction, it is not to be limited thereto, but can be used in other racket structures such as squash racquets, racquet-ball racquets, etc.

The core 29 of the racket including the head, the throat and the handle is composed of a syntactic foam. For the purposes of the present invention, syntactic foam is defined as a thermosetting resin having a microballoon filler mixed therein. Such microballoons are known in the art and are extremely small hollow spheres preferably made of glass but which may also be made of other polymeric material such as phenolics, polypropylenes, polystyrenes, etc.

The subject invention can utilize syntactic foams as described above, either singularly or in combination with other non-syntactic foams. The combination of a syntactic foam with a urethane foam has been found to be particularly advantageous. In addition to the urethane foam, this invention can use combinations of syntactic foam with any non-syntactic foam which is manufactured from any polymeric material. The ratio of syntactic foam to non-syntactic foam may be varied in accordance with this invention. In accordance with the broad aspects of this invention core 29 can comprise from about 90 to about 10 percent of a syntactic foam and from about 10 to about 90 percent of a non-syntactic foam.

Suitable thermosetting resins for use in accordance with this invention include two part epoxy systems, peroxide catalyzed polyester resins, isocyanate catalyzed urethane resins, acrylic or methacrylic resins, etc.

The ratio of the thermosetting resin to microballoons may be varied. This ratio may be from about 2.5 to about 5 to 1. A more preferred range is from about 3.5 to about 4.5 to 1. The most preferred ratio is 4.35 to 1.

As indicated in FIGS. 3, 4, and 5, when constructing a racket, the syntactic foam core is formed into a box structure of varying dimensions depending upon the location along the head and handle. A fiberglass material, which may be woven or nonwoven, substantially surrounds the entire syntactic foam core 29 so as to form an outer layer. Additional strength may be provided by further including in the structure a ribbon of an advanced high strength fiber material such as graphite, aramid, boron and mixtures thereof. In a preferred embodiment, this material 33 and 34 extends about opposite sides of the racket along the areas 25 and 27 indicated in FIG. 1. A dotted line 35 is exemplary of a further high strength fiber ribbon which may be added if further stiffening of head 11 is required. It should be noted that while an additional high strength ribbon 35 is shown on the outer edge of the racket bow, an additional high strength ribbon can likewise be added to the inner edge of the racket bow. The addition of this ribbon to the inner and outer edge of the racket bow enables the racket to resist distortion by forces resulting from stringing tension. These additional high strength ribbons likewise impart torsional stiffeners to the racket.

Referring to FIG. 4, it should be seen that there is an overlap of high strength ribbons 33 and 34 with high strength ribbons 37 and 38 in the vicinity of section line 4—4. In the structure as illustrated in FIG. 4, four separate ribbons 33, 34, 37 and 38 are utilized. Ribbons 37 and 38 are shorter, being approximately 20 inches long. Ribbons 33 and 34 are longer, being approximately 30 inches long. Referring to ribbons 33 and 37, a shorter section of ribbon 37 is laid on one side of the bow starting at the apex of the bow 62 and terminating in the vicinity of section line 4—4. The longer ribbon section 33 likewise commences in the vicinity of apex 62 and proceeds down the opposite side of the bow through the vicinity of section line 4—4 and terminates in the grip area of the racket. In the vicinity of apex 62 and section line 4—4, ribbons 33 and 37 are overlapped slightly.

The above description represents one embodiment of this invention relative to the placement of high strength ribbons. It is understood by one skilled in the art that other placement of said high strength ribbon is possible. For example, in this regard it should be noted that two ribbons of high strength material may be used. One ribbon is of such a length that when laid around the bow area of racket 11 the ends of the ribbon terminate in the vicinity of section line 4—4. A second ribbon of high strength material which is substantially longer than the first ribbon is laid around the bow area in such a manner that the ends of said second ribbon terminate in the area of handle 19 of racket 11. From this illustration it can be seen that in the vicinity of the bow of racket 11 this double ribbon arrangement results in maximum strength. As in the bow area, the two ribbons are in an abutting relationship. This abutting relationship terminates in the vicinity of section line 4—4.

The ultimate structure as illustrated comprises a syntactic foam core covered by a fiberglass material bonded thereto and having a layer or layers, one on each surface, of graphite or similar material about opposite sides of the entire head and down the length of the handle including that portion covered by grip 19.

The fiberglass material may be either woven or nonwoven as indicated above and the width thereof should be sufficient so that, as the structure is molded, the entire periphery of the syntactic foam will be covered by the fiberglass material. The fiberglass material should have a thickness between 0.4 mm and 0.8 mm with a preferred form being a woven fiberglass material having a thickness of substantially 0.56 mm.

The high strength fiber material is preferably woven into ribbons so as to provide a convenient manner in which to manufacture the racket. One such ribbon is available from Fabric Development, Inc. and is made of graphite fibers woven into a larger ribbon structure by use of a weaving material such as Kevlar, an aramid, which is a trademark of E. I. DuPont and consists of 3006 K graphite warp and 380 denier Kevlar 49 fill with total warp ends 18, fill picks 10 to the inch. The width of this graphite-Kevlar ribbon should be sufficient to provide the strength desired and, in the tennis racket illustrated, would be between ⅜ inches and ½ inches. A preferred width is ⅜ inches.

The thickness of the high strength ribbon for use in accordance with this invention is approximately 0.020 inches. Mutually, this thickness can vary depending on the width of the ribbons and the fibers from which the ribbon is formed.

One of the advantages of using the structure of the present invention in a tennis racket is that it allows the manufacturer of the racket to provide selective reinforcement by the placement of the high strength ribbon. One such illustration is the use of additional ribbon material 39, FIG. 5 wherein such addition increases the rigidity of handle 15. Additionally, a further ribbon 35 could be placed around the outer periphery of the head as shown in FIG. 3. This would increase the rigidity of the head.

Figure 6:
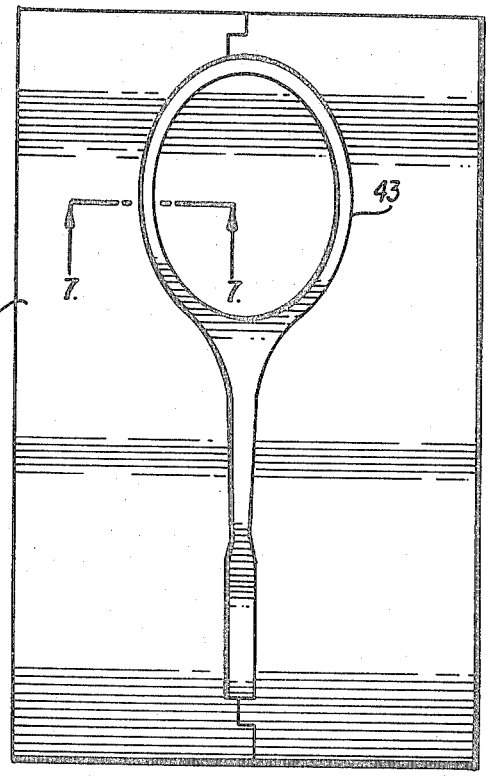
FIG. 6 is a schematic representation of a mold plate which may be used in construction of the racket of the present invention.
Figure 7:
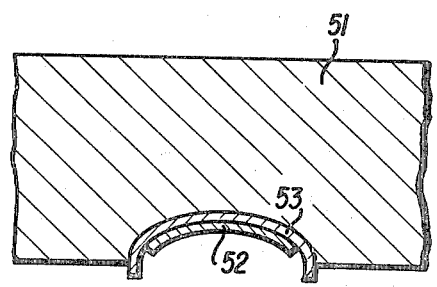
FIG. 7 is a schematic sectional view taken through lines 7—7 of FIG. 6 and a partial sectional view of the top mold plate and spacer plate used therewith.
Figure 7:
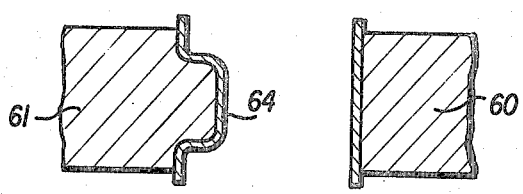
Figure 7:
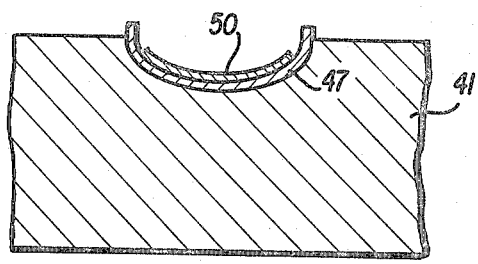

Turning now to FIGS. 6 and 7, there is illustrated therein schematically a method of manufacturing the structural member of the present invention and, more specifically, the manufacture of the tennis racket illustrated in FIGS. 1 and 2. FIG. 6 illustrates a bottom mold plate 41 having a mold section 43 in the configuration of the desired tennis racket. FIG. 7 is a sectional view taken through lines 7—7 of FIG. 6 and further illustrates the upper mold plate 51 and the bow former plate 60 and side arm center plate 61. Although not limited thereto, separate pieces of fiberglass are illustrated for forming the final cover for the box-like center structure. These pieces may be held in place prior to the molding process by means such as a gel coat which is used to cause the fiberglass strips 47 and 53 to adhere to their respective surfaces on the mold and spacer plate. After these pieces are firmly in place, the high strength ribbon as described above may or may not be coated with the gel coat and selectively applied. Ribbon 50 is shown in place. The high strength ribbon is selectively placed about the mold as desired as discussed above to obtain the structure as shown in FIGS. 3, 4 and 5.

In the manufacturing process, mold plate 41 may be prepared by coating the inner surface thereof with a gel coat of a polymeric material which is to be utilized in the formation of the syntactic foam. Fiberglass strip 47 is then placed in mold 41 such that the upper edges of fiberglass strip 47 protrude slightly above the edges of mold 41. Spacer plate 60 is prepared separately by coating the inner surface thereof with a gel coat in the manner as described above and preparing fiberglass strip 64 on the inner periphery thereof. Fiberglass strip 64 protrudes slightly from the edges of bow former plate 60. Mold plate 51 may likewise be prepared by placing fiberglass strip 53 therein in such a manner that strip 53 protrudes slightly from the mold cavity of mold 51.

High strength ribbons 50 and 52 are likewise placed in the bottom of the mold cavity of plates 41 and 51 as is illustrated in FIG. 7. An additional gel coat may be added to ribbons 50 and 52 if desirable. Bow former plate 60 is then placed in a mating relationship onto mold plate 41. The resulting mold cavity which is formed by the placement of bow former plate 60 over mold plate 41 is then filled with a positive meniscus of the uncured syntactic foam mixture as described above. Mold plate 51 is then placed on bow former plate 60 and pressure applied to mold plates 41 and 51 respectively. The positive meniscus of syntactic foam as placed in the composite mold cavity formed by bow former plate 60 and mold plate 41 is sufficient to fill the remaining cavity of mold plate 51. If uncured syntactic foam is present after respective placement of mold plates 40 and 51 in relationship to bow former spacer plate 60 as described above, said excess weeps out into an overflow cavity which is not illustrated. Sufficient heat and pressure is then applied to the composite structure to effect a curing of the syntactic foam mixture.

As was mentioned above, this invention is adapted to utilize as a core mixtures of syntactic and non-syntactic foams. In one embodiment a syntactic foam mixture in an uncured state is prepared, for example, a mixture of microballoons in a catalyzed epoxy resin. This mixture is then mixed with a non-syntactic foam which will blow under proper conditions. The mixture of syntactic and non-syntactic foam is than placed in a prepared mold. The mold is then closed and proper conditions applied to effect the blowing and curing of the non-syntactic foam.

Likewise, it is possible to utilize in this invention a foam core structure which consists of a non-syntactic foam which is further filled with microballoons. In this instance, a non-syntactic foam is prepared in such a manner that it is in condition to blow. To this mixture is added microballoons. The resulting composite mixture is then placed into the mold cavity, the mold closed and proper conditions are applied to the mold to effect the final blowing and curing of the resulting mixture.

For purposes of this definition, a syntactic foam is defined as a foam wherein all the cells are formed by microballoons. In contrast, a non-syntactic foam is defined as a foam wherein cells are formed by a blowing agent. From this description it can be seen that the mixtures as described above, wherein microballoons are added to the non-syntactic foam, results in a structure having cells which are formed by a blowing gas and cells which are formed by microballoons.

Figure 8:
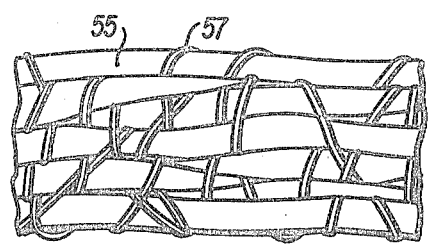
FIG. 8 is a schematic illustration of a graphite ribbon which may be used in the present invention.

FIG. 8 is a schematic view of a preferred graphite ribbon showing the separate graphite individual ribbons 55 with the Kevlar weaving being used to create the desired width of the ribbon to be used.

The above description and drawings are illustrative only, and the invention is to be limited only by the scope of the following claims.

What is claimed is:

1. In a racket frame having a head, throat and handle, an improved construction wherein said frame comprises
    a core consisting of a mixture of syntactic foam and a blowable non-syntactic foam;
    a fiberglass outer shell bonded to and substantially covering said core; and
    the racket frame further comprising high strength fiber material comprising a ribbon of graphite material woven together by aramid fibers located about at least a portion of said racket frame.

2. The racket frame of claim 1 wherein said high strength fiber material is adjacent both faces of the racket frame.

3. The racket frame of claim 1 wherein said ribbon has a width of between ⅜ inch and ½ inch.

4. The racket of claim 1 wherein said ribbon has a width of ⅜ inches.